(12) United States Patent
Saber et al.

(10) Patent No.: US 12,250,074 B2
(45) Date of Patent: Mar. 11, 2025

(54) AUTOENCODERS WITH LIST DECODING FOR RELIABLE DATA TRANSMISSION OVER NOISY CHANNELS AND METHODS THEREOF

(71) Applicant: Samsung Electronics Co., Ltd., Suwon-si (KR)

(72) Inventors: Hamid Saber, San Diego, CA (US); Homayoon Hatami, San Diego, CA (US); Jung Hyun Bae, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 11 days.

(21) Appl. No.: 18/075,334

(22) Filed: Dec. 5, 2022

(65) Prior Publication Data

US 2023/0198672 A1 Jun. 22, 2023

Related U.S. Application Data

(60) Provisional application No. 63/291,021, filed on Dec. 17, 2021.

(51) Int. Cl.
*H04L 1/00* (2006.01)
*G06N 3/08* (2023.01)
*H04L 1/20* (2006.01)
*H04L 25/03* (2006.01)

(52) U.S. Cl.
CPC ............. *H04L 1/0076* (2013.01); *G06N 3/08* (2013.01); *H04L 1/203* (2013.01); *H04L 25/03165* (2013.01)

(58) Field of Classification Search
CPC ......... H04L 1/00; H04L 1/0076; H04L 1/203; H04L 25/03165; G06N 3/08
See application file for complete search history.

(56) References Cited

U.S. PATENT DOCUMENTS

| 7,502,766 | B2* | 3/2009 | Dodgson | G06N 3/049 |
| | | | | 341/51 |
| 2012/0185755 | A1* | 7/2012 | Orlik | H03M 13/136 |
| | | | | 714/781 |
| 2016/0013810 | A1 | 1/2016 | Gross et al. | |
| 2018/0357530 | A1 | 12/2018 | Beery et al. | |
| 2020/0227073 | A1* | 7/2020 | Reed | G10L 21/0224 |
| 2020/0295786 | A1 | 9/2020 | Palgy | |
| 2021/0383207 | A1* | 12/2021 | Beery | G06N 3/047 |
| 2021/0383220 | A1* | 12/2021 | Beery | H03M 13/6597 |
| 2022/0231785 | A1* | 7/2022 | Beery | H04L 1/0052 |

FOREIGN PATENT DOCUMENTS

EP 4064095 A1 * 9/2022 ......... G06F 21/6209

* cited by examiner

*Primary Examiner* — Samir W Rizk
(74) *Attorney, Agent, or Firm* — Lewis Roca Rothgerber Christie LLP (57) ABSTRACT

A system and a method may include a receiver circuit configured to receive an encoded codeword over a channel from an encoder neural network of an encoder, and a decoder circuit, including a decoder neural network, configured to decode the encoded codeword, and generate a list of decoded message words, the list of the decoded message words including a plurality of candidate message words representing the message word.

20 Claims, 6 Drawing Sheets

RECEIVING, BY A DECODER, AN ENCODED CODEWORD FROM AN ENCODER NEURAL NETWORK OF AN ENCODER OVER A CHANNEL
502

↓

DECODING, BY A DECODER NEURAL NETWORK OF THE DECODER, THE RECEIVED ENCODED CODEWORD, AND GENERATING A LIST OF DECODED MESSAGE WORDS, THE LIST OF THE DECODED MESSAGE WORDS COMPRISING A PLURALITY OF CANDIDATE MESSAGE WORDS REPRESENTING THE MESSAGE WORD
504

↓

TRAINING THE DECODER NEURAL NETWORK, THE TRAINING COMPRISING PERFORMING A LOSS FUNCTION ON THE LIST OF THE DECODED MESSAGE WORDS, WHEREIN THE PERFORMING THE LOSS FUNCTION COMPRISES: COMPUTING A LOSS FUNCTION FOR EACH CANDIDATE MESSAGE WORD OF THE PLURALITY OF CANDIDATE MESSAGE WORDS; AND SELECTING A CANDIDATE DECODED MESSAGE WORD CORRESPONDING TO A SMALLEST LOSS FUNCTION FROM AMONG THE COMPUTED LOSS FUNCTIONS.
506

AUTOENCODERS WITH LIST DECODING FOR RELIABLE DATA TRANSMISSION OVER NOISY CHANNELS AND METHODS THEREOF

CROSS-REFERENCE TO RELATED APPLICATION(S)

This application claims the priority benefit under 35 U.S.C. § 119(e) of U.S. Provisional Application No. 63/291,021, filed on Dec. 17, 2021, the disclosure of which is incorporated by reference in its entirety as if fully set forth herein.

TECHNICAL FIELD

The disclosure generally relates to deep-learning. More particularly, the subject matter disclosed herein relates to improvements to autoencoders with list decoding for reliable data transmission over noisy channels and methods thereof.

SUMMARY

In communication systems, reliable transmission over noisy channels has been an active research area for many years. Channel coding is the main tool to achieve reliable transmission by finding higher dimensional representations of the input data. In his seminal work, famous mathematician Shannon, proved the existence of capacity-achieving sequence of codes by random construction of an ensemble and investigating the conditions for the feasibility of reliable communication. Design of channel codes that approach or achieve the channel capacity has since then been an elusive goal. Among the most landmark codes designed thus far are Turbo, LDPC and polar codes.

According to some embodiments of the present disclosure, a system may include a receiver circuit configured to receive an encoded codeword over a channel from an encoder neural network of an encoder, and a decoder circuit, including a decoder neural network, configured to decode the encoded codeword, and generate a list of decoded message words, the list of the decoded message words including a plurality of candidate message words representing the message word.

The receiver circuit may be further configured to perform training of the decoder neural network.

The training may include performing a loss function on the list of the decoded message words.

The performing of the loss function may include computing a loss function for each candidate message word of the plurality of candidate message words, and selecting a candidate decoded message word corresponding to a smallest loss function from among the computed loss functions.

The loss function may include a mean squared error (MSE) loss function or a binary cross entropy (BCE) loss function.

The function may be the BCE loss function, and wherein the computing the BCE loss function includes determining an average BCE of a first vector and a second vector of length K.

The decoder may include: a first sub-decoder configured to receive a first vector of the encoded codeword from the encoder and a second vector of the encoded codeword from the encoder; a second sub-decoder configured to receive the first vector of the encoded codeword from the encoder, a third vector of the encoded codeword from the encoder, and a first output from the first sub-decoder; a third sub-decoder configured to receive the second vector of the encoded codeword from the encoder, the third vector of the encoded codeword from the encoder, and a second output from the second sub-decoder; and a fourth sub-decoder configured to receive the first vector of the encoded codeword from the encoder, the second vector of the encoded codeword from the encoder, the third vector of the encoded codeword from the encoder, and a third output from the third sub-decoder.

The receiver circuit may be further configured to perform a sigmoid function at a fourth output from the fourth sub-decoder to generate the list of the decoded message words.

According to some embodiments of the present disclosure, a method may include receiving, by a decoder, an encoded codeword from an encoder neural network of an encoder over a channel, and decoding, by a decoder neural network of the decoder, the received encoded codeword, and generating a list of decoded message words, the list of the decoded message words including a plurality of candidate message words representing the message word.

The method may further include training the decoder neural network, the training including performing a loss function on the list of the decoded message words.

The performing the loss function may include computing a loss function for each candidate message word of the plurality of candidate message words, and selecting a candidate decoded message word corresponding to a smallest loss function from among the computed loss functions.

The loss function may include a mean squared error (MSE) loss function or a binary cross entropy (BCE) loss function.

The loss function may be the BCE loss function, and wherein the computing the BCE loss function includes determining an average BCE of a first vector and a second vector of length K.

The decoding may include: receiving, by a first sub-decoder, a first vector of the encoded codeword from the encoder and a second vector of the encoded codeword from the encoder; receiving, by a second sub-decoder, the first vector of the encoded codeword from the encoder, a third vector of the encoded codeword from the encoder, and a first output from the first sub-decoder; receiving, by a third sub-decoder, the second vector of the encoded codeword from the encoder, the third vector of the encoded codeword from the encoder, and a second output from the second sub-decoder; and receiving, by a fourth sub-decoder, the first vector of the encoded codeword from the encoder, the second vector of the encoded codeword from the encoder, the third vector of the encoded codeword from the encoder, and a third output from the third sub-decoder.

The decoding may further include performing a sigmoid function at a fourth output from the fourth sub-decoder to generate the list of the decoded message words.

According to some embodiments of the present disclosure, a decoder may include a processor configured to receive an encoded codeword from an encoder neural network of an encoder over a channel and decode, by a decoder neural network of the decoder, the received encoded codeword, and generate a list of decoded message words, the list of the decoded message words including a plurality of candidate message words representing the message word.

The processor may be further configured to train the decoder neural network, the training including performing a loss function on the list of the decoded message words.

The performing the loss function may include computing a loss function for each candidate message word of the plurality of candidate message words and selecting a candidate decoded message word corresponding to a smallest loss function from among the computed loss functions.

The decoder may further include: a first sub-decoder configured to receive a first vector of the encoded codeword from the encoder and a second vector of the encoded codeword from the encoder; a second sub-decoder configured to receive the first vector of the encoded codeword from the encoder, a third vector of the encoded codeword from the encoder, and a first output from the first sub-decoder; a third sub-decoder configured to receive the second vector of the encoded codeword from the encoder, the third vector of the encoded codeword from the encoder, and a second output from the second sub-decoder; and a fourth sub-decoder configured to receive the first vector of the encoded codeword from the encoder, the second vector of the encoded codeword from the encoder, the third vector of the encoded codeword from the encoder, and a third output from the third sub-decoder.

The processor may be further configured to perform a sigmoid function at a fourth output from the fourth sub-decoder to generate the list of the decoded message words.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

In some embodiments, an (N,K) channel code is made by designing an encoder that maps a set of $2^K$ binary message words of length K to a set of $2^K$ codewords of length N for transmission over a channel. Mathematical analysis may be used to tailor the encoder and decoder to one another. For example, in a maximum a posteriori (MAP) decoder, which minimizes a block error rate (BLER), the encoder may be designed such that the pairwise distance properties of the code is optimized. MAP decoding is rarely used unless the code is very short or can be described via a trellis diagram with a relatively small size, e.g., convolutional codes. In some embodiments, a decoder may be designed first. Polar code design may follow this approach, where the encoder design is carried out to optimize the performance under a successive cancellation (SC) decoder. Thus, many code design approaches heavily rely on an information-theoretically well-defined channel model, which in most cases is an additive white Gaussian noise (AWGN) channel, and employ mathematical analysis as the essential tool. More importantly, the code design progress has thus far been sporadic and heavily relying on the ingenuity of humans.

There has been a growing interest in automating the design of encoder and decoders using deep learning framework. A deep-learning based framework allows for design of encoder and decoder for channels that may not be described by a well-defined model, or that can be described but the model is too complex for code design. Although the ultimate goal of deep learning-based design is envisioned to be for arbitrary channels, a first step towards this end can be designing codes which can compete with the state-of-the-art channel codes over the AWGN channel. The code design can essentially be applied to any channel provided that sufficient transmissions over the channel are performed so as to collect a sufficiently large training set. Deep-learning has been used to design decoders for the traditional encoders.

Deep learning has also been used to design both encoder and decoder based on Autoencoders (AEs). AEs are powerful deep learning frameworks with a wide variety of applications. AEs fall into two categories: under-complete and overcomplete AEs. An under-complete AE is used to learn latent representation of the input data by transforming it to a smaller latent space. Under-complete AEs are used for numerous tasks including denoising, generative models and representation learning. On the other hand, over-complete AEs add redundancy to the input data so as to transform it to a higher dimension. One example application of over-complete AEs is that the higher-dimensional representation can be transmitted over a noisy channel while allowing the receiver to reliably decode the input data. In particular, convolutional neural network (CNN) and recurrent neural network (RNN) have been used to mimic the architecture of classical turbo encoder and decoder. According to some embodiments of the present disclosure, a TurboAE may have competitive performance to the state-of-the-art traditional codes while being trainable for an arbitrary channel model.

Accordingly, techniques to improve the design of AEs for reliable communication over noisy channels are contemplated. In some embodiments, a list autoencoder (listAE) is described, which includes a deep learning framework applicable to AE architecture and the decoder network outputs a list of decoded message word candidates.

In another embodiment, a loss function that operates on the output list is described. The loss function aims to reduce (e.g., minimize) the BLER of a genie-aided (GA) decoder by assuming that a genie is available at the decoder output and, whenever the transmitted message word is present in the list, the loss function indicates which candidate it is. In other words, with the GA decoder, a block error event is counted if and only if the transmitted word is not in the output list. The functionality of a genie may be emulated by using classical error detection codes. For example, a cyclic redundancy check (CRC) code may be appended to the message word prior to encoding by the encoder network. At the decoder, a CRC check may be carried out on the output candidates to select a single candidate as the final output of the decoder.

In some embodiments, the listAE framework may be applied to any AE architecture. For example, the AE architecture may be one that can decode the received word on a sequence of component codes with decreasing rates. The architecture, referred to as incremental redundancy listAE (IR-listAE), may show a coding gain over the state-of-the-art while providing error correction and detection capability simultaneously.

Figure 1:
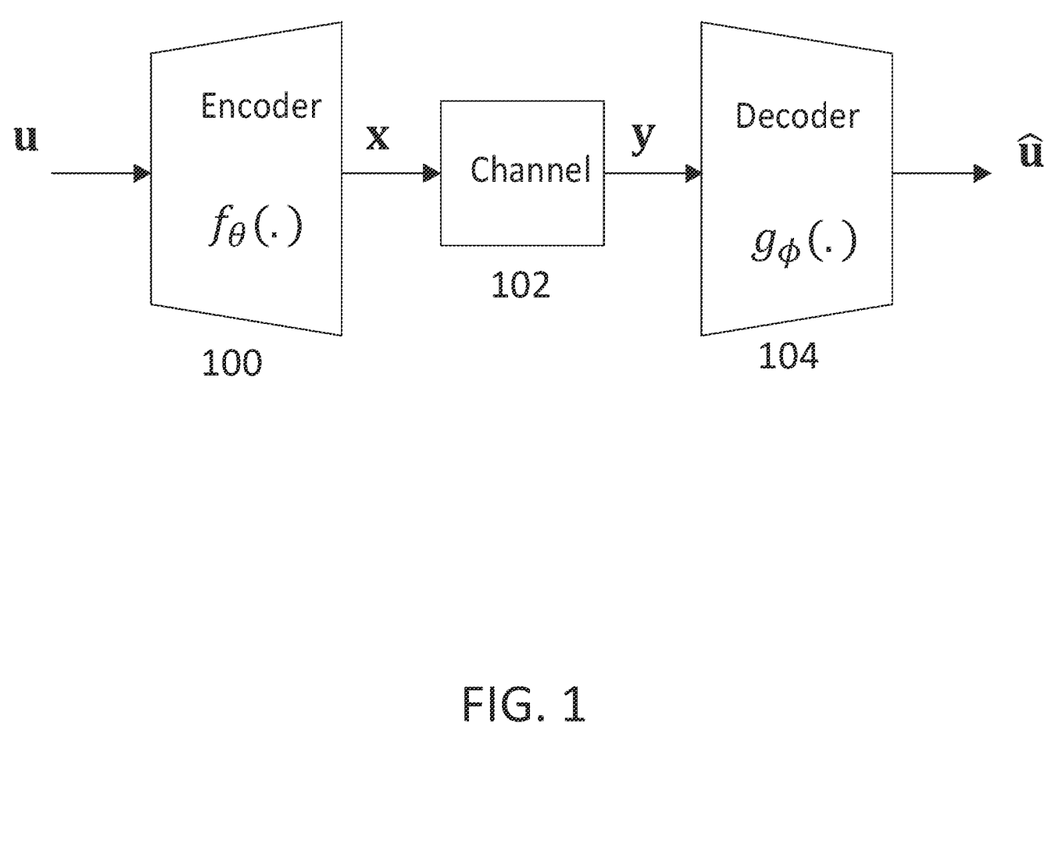
FIG. 1 is a block diagram of an example communications system including an encoder and a decoder with a signal transmitted therebetween over a channel, according to various embodiments of the present disclosure.

FIG. 1 is a block diagram of an example communications system including an encoder 100 and a decoder 104 with a signal transmitted therebetween over a channel 102. In some instances, this channel 102 may be a noisy channel which may adversely affect the signal transmission. Accordingly, the embodiments of the present disclosure contemplate techniques to provide reliable transmission despite the channel being a noisy channel.

As can be seen in FIG. 1, a message word of K bits is formed as $u=[u_1, \ldots, u_K]$, where the $u_i$ take binary values from $\{0,1\}$. The message word may be encoded using an encoder neural network $F_\theta(.)$ to obtain $x=[x_1, \ldots, x_N]=f_\theta(u)$ where $\theta$ denotes the weights of the neural network and N denotes the code length. A power normalization block may be applied to x to give a codeword with zero mean and unit variance code symbols, i.e., $E(x_i)=0$ and $E(x_i^2)=1$ for $i=1, \ldots, N$. Accordingly, the code word x may be transmitted over the channel. The channel takes the codeword x as input and outputs a noisy version $y=[y_1, \ldots, y_N]$, where the $y_i$ are real values. While an information-theoretically defined channel model is not necessary, if there is such a model, that channel may be defined as a vector channel with transition probability density function (pdf) $W_N(y|x)$. One type of commonly used channel for code design is an additive white Gaussian noise (AWGN) channel for which the output $y_i = x_i + w_i$ where $w_i$ is Gaussian random variable with zero mean and variance $\sigma^2$. For AWGN channel $W_N(y|x) = \Pi_{i=1}^N W(y_i|x_i)$, where $$W(y|x) = \frac{1}{\sigma\sqrt{2\pi}} \exp\left(-\frac{(y-x)^2}{2\sigma^2}\right).$$

In some embodiments, the decoder 104 network receives the channel 102 output vector y and applies a decoding function $g_\phi(.)$ on the output vector y to give the decoded message word $\hat{u} = g_\phi(y)$ where $\phi$ represents the weights the decoder 104 neural network. The encoder 100 and decoder 104 networks together form an AE. The error correction performance of the auto-encoder may be measured in terms of bit error rate (BER) and block error rate (BLER), defined as $$\frac{1}{K}\sum_{i=1}^K Pr(\hat{u}_i \neq u_i)$$

and Pr $(\hat{u} \neq u)$, respectively.

The performance of an AE depends on the encoding and decoding functions as well as the amount of impairment added by the channel 102, which for AWGN is measured in terms of signal-to-noise ratio (SNR). Therefore, it is desirable to reduce (e.g., minimize) the BLER or BER of the AE for different levels of impairment, e.g., a wide range of SNR.

List Autoencoder (listAE)

Although designing new AE architectures can be performed by improving the error correction performance, it can also be accomplished by tackling the problem through another dimension. It may be difficult for the decoder 104 network to reliably decide which message word has been transmitted by only one guess. However, the reliability may be improved by a framework that allows the decoder 104 network to output a list of L candidates. A genie may be assumed to be available at the decoder 104 output and to identify the transmitted message word if it is in the list. Such AE framework may be referred to as a genie-aided (GA) listAE. Herein the present disclosure, a genie may refer to a device or software component that informs us during, for example, a testing or training phase, whether the transmitted message word is present in the output list generated by the decoder at the receiver, and if it is present, then which one of the message words in the output list is the transmitted message word.

Description of GA listAE

Figure 2:
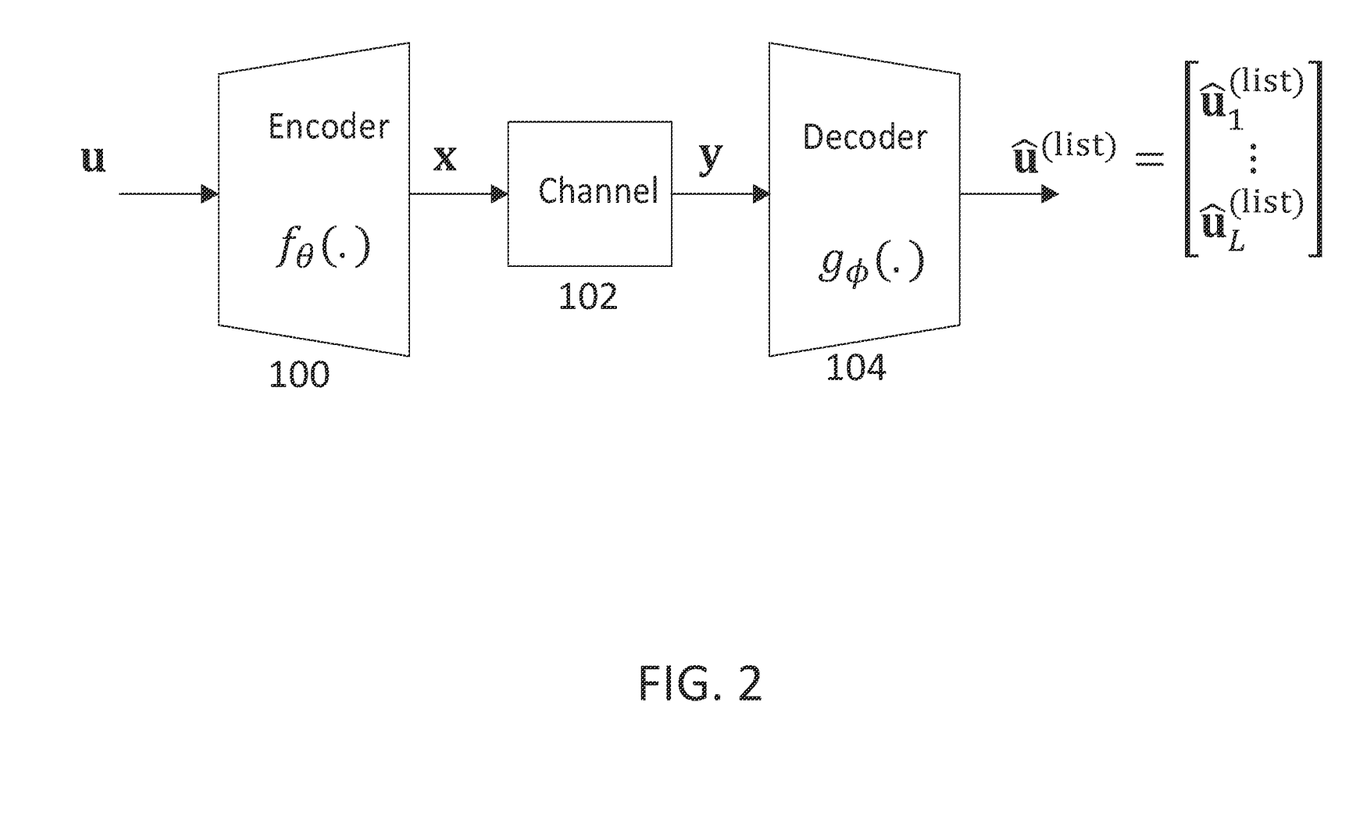
FIG. 2 is a block diagram similar to FIG. 1, with a list output by the decoder, according to various embodiments of the present disclosure.

In some embodiments, a listAE is defined as any AE that outputs a list of candidates. FIG. 2 is a block diagram similar to the one shown in FIG. 1, except this one outputs a list L. Accordingly, the output of the decoder 104 is a general listAE with a list size L. One type of AE is a special case of listAE with a list size of L=1. As can be seen from FIG. 2, the difference between some AEs and the one shown in FIG. 2 is that the output is a list of candidates. The trainable weights of the encoder 100 and decoder 104 network are denoted by $\theta$ and $\phi$, respectively. A power normalization may be applied to normalize the power of transmitted codeword x. More details of the power normalization will be described later.

During the testing phase, the decoder 104 may output a single candidate $\hat{u}$ instead of a list, so there is a desire for the selection process where a single candidate is chosen from the list. For example, a GA decoder outputs $\hat{u}=u$ if u is equal to one of the rows of $\hat{u}^{(list)}$, otherwise it outputs a randomly chosen row of $\hat{u}^{(list)}$. In other words $$\hat{u} = \begin{cases} u & \text{if } \hat{u}_j^{(list)} = u \text{ for any } j \in \{1, \ldots, L\} \\ \hat{u}_r^{(list)} & \text{otherwise} \end{cases} \quad (1)$$

where r is a random number chosen uniformly from 1 to L. During the training phase a value of each element of vectors in the output list $\hat{u}^{(list)}$ is configured to take a real number between zero and one, e.g., by passing through a Sigmoid activation, while in the testing phase the outputs are rounded to the nearest integer to give binary values so that the BER and BLER can be computed between $\hat{u}$ and u from Equation (1).

Loss Functions for GA listAE

In some embodiments, an AE loss function which reduces (e.g., minimizes) a distance measured between the input and output, and may be used to optimize the BER or BLER. In some instances, there are a number of distance measurement techniques such as mean squared error (MSE) and/or binary cross entropy (BCE), which may be more suitable for BER optimization. Although BER optimization may indirectly optimize the BLER, finding BLER-specific loss function with rather efficient training complexity may be a problem. With GA listAE, the performance metric to optimize is neither BER nor BLER, but instead, it is a GA BLER.

The challenge for defining a loss function which is tailored to the GA listAE lies in how to mathematically model the genie operation. One may be that the genie operation is a processing block which takes the list of candidates as well as the transmitted message word, and outputs a single candidate depending on the presence of the message word in the list. The condition for checking this presence may include rounding the candidate message words in the list and then comparing them to the transmitted word. This not only introduces zero derivative in the back propagation, but also becomes complicated it due to the conditional statements (e.g., "if" statements) for comparing each list member and the transmitted word. It may not necessarily be clear as to how the comparison can be tackled in the back propagation. Thus, some embodiments of the present disclosure provide for a modified loss function that reflects how "close" the output list is to the message word without involving the precise genie operation. The loss function should take small values when the message word is close to any candidate in the list. One such loss function can be based on the minimum, over the candidates, of a loss metric between the transmitted message word and the candidates. In particular, the loss function can be shown as:

$$\text{loss}_1(\hat{u}^{(list)}, u) = \min_{l \in \{1, \ldots, L\}} \rho(\hat{u}_l^{(list)}, u), \quad (2)$$

where $\rho$ is the average BCE loss which takes two vectors $\hat{x}$ and x of length K, and shown as:

$$\rho(\hat{x}, x) = \frac{1}{K}\sum_{k=1}^K bce(\hat{x}_k, x_k). \quad (3)$$

One may conjecture that due to sub-optimality of the loss metric, not only should the loss function attempt to ensure the existence of a candidate with smallest metric, but it should also ensure that other candidates in the list have small loss values. The following two loss functions attempt to output a list with smallest average loss and a small maximum loss value, respectively.

$$\text{loss}_2(\hat{u}^{(list)}, u) = \frac{1}{L}\sum_{l=1}^{L} \rho(\hat{u}_l^{(list)}, u) \quad (4)$$

$$\text{loss}_3(\hat{u}^{(list)}, u) = \min_{l \in \{1, \ldots, L\}} \rho(\hat{u}_l^{(list)}, u) + \lambda \cdot \max_{l \in \{1, \ldots, L\}} \rho(\hat{u}_l^{(list)}, u) \quad (5)$$

In the above equations, $\lambda$ is a design parameter and can be any positive value. Accordingly, $\text{loss}_1$ may result in the best performance. If an additional restriction is put on the decoder network, the capability to output the best list from the genie point of view may be compromised. In other words, the likelihood of the transmitted message word being present in the list may be decreased at the cost of decreasing the loss for other candidates. Consequently, because the best results are achieved with $\text{loss}_1$, further explanation of this loss function will be described in more detail.

How to Realize the Genie

In some embodiments, a genie is not available at the output of the decoder. Thus, in absence of the genie, and without any further constraints, it may be difficult to tell whether the transmitted word is in the list because there is no correlation between the message bits. Hence, every candidate may be considered a valid message word. To realize a genie, an intentional correlation between the message bits may be introduced, e.g., through linear equations over a binary field, and at the decoder side checking whether the equations are satisfied. If they are not satisfied for a list candidate, the candidate cannot be the transmitted word. Such linear equations may be implemented using CRC codes in coding theory.

With a Z bit CRC generated by a polynomial $g(x)=g_0+g_1 x+\ldots+g_z x^z$, a word of K-Z bits is generated and is passed to the CRC calculator to generate Z CRC bits. The CRC bits are appended to the end of the message word to give the length-K vector u as the encoder input. At the decoder side, each candidate in the list may be checked for passing CRC equations. Among the candidates which pass the CRC, one candidate may be randomly chosen as the final output of the decoder. This type of listAE may be referred to as CRC-aided list AE (CA listAE). Particularly, the final length-K decoded word u is given as:

$$\hat{u} = \begin{cases} \hat{u}_j^{(list)} & \text{if CRC check is passed for } \hat{u}_j^{(list)} \text{ for a } j \in \{1, \ldots, L\} \\ \hat{u}_r^{(list)} & \text{otherwise} \end{cases} \quad (6)$$

where r is a random number chosen uniformly from 1 to L.

In some embodiments, during the training phase, CRC bits are treated as information bits. In other words, the correlation between the bits of u is not taken into account to minimize the loss function. The reason is similar to those which resulted in employing loss1 avoiding precise genie operation. The CRC check provides for rounding each candidate word in the list and then performing operations in Galois Field with "if" statements. Accordingly, $\text{loss}_1$ may be employed without CRC consideration in the training phase.

In other words, the CRC is only added for performance evaluation in the testing phase.

It should be noted that adding CRC to the message bits reduces the effective code rate by a factor of Z/K. Although this factor may be negligible, especially for larger message word length K, it may be more desirable to realize genie without any rate reduction. In some embodiments, a scalar metric $\rho_i=1, \ldots, L$ may be associated to each candidate such that it reflects a posteriori probability (APP) metric. The final decoder output is then chosen as the candidate with the greater (e.g., maximum) metric. In the training phase, a BCE loss calculated between u and the candidate with the maximum metric may be reduced (e.g., minimized). Successive cancellation list decoding of polar codes may follow this approach and may provide for a meaningful coding gain over non-list decoding algorithms.

An Architecture for listAE: IR-listAE

In some embodiments, the listAE is a general framework that can be applied to various AE architectures. Accordingly, a specific AE architecture referred to as incremental redundancy auto-encoder (IR-AE) will be described. The encoder of IR-AE is substantially the same as TurboAE architecture, and the decoder also relies on a similar information exchange between the decoding blocks. For example, a rate $$\frac{1}{n} \text{ IR-AE}$$

uses n encoding blocks which may be applied to an interleaved length-K message word and give the length-N, N=nK, codeword $x=[x_1, \ldots, x_n]$ after proper power normalization. Like TurboAE, IR-AE decoder includes I iteration blocks. At iteration i, a series of decoding blocks which are serially concatenated take a certain subset of $\{y_1, \ldots, y_n\}$ with applicable interleavers and a feature matrix which is to represent the A Posteriori Probability (APP) of the message word as input, and then output an updated feature matrix. The same architecture may be replicated in every iteration, but with independent learnable weights. If a decoding block takes a subset of $\{y_1, \ldots, y_n\}$ including k vectors, i.e., $\{y_{i_1}, \ldots, y_{i_k}\}$, the decoding block may be referred to as a rate-1/k decoding block, because the decoding block may be associated with an effective encoder which outputs the corresponding k vectors $\{x_{i_1}, \ldots, x_{i_k}\}$. An AE described as above may be an IR-AE if in an iteration, each decoding block has a rate that is smaller or equal to the rate of the previous block. Thus, more powerful codes with smaller rates may decode the message word based on an improved APP feature matrix given by previous weaker codes with higher rates. Herein the present disclosure, training and evaluation of the performance of a rate-1/3 IR-AE are described. A more detailed encoder and decoder architecture and training methodology is described below.

Rate-1/3 IR-listAE

Figure 3:
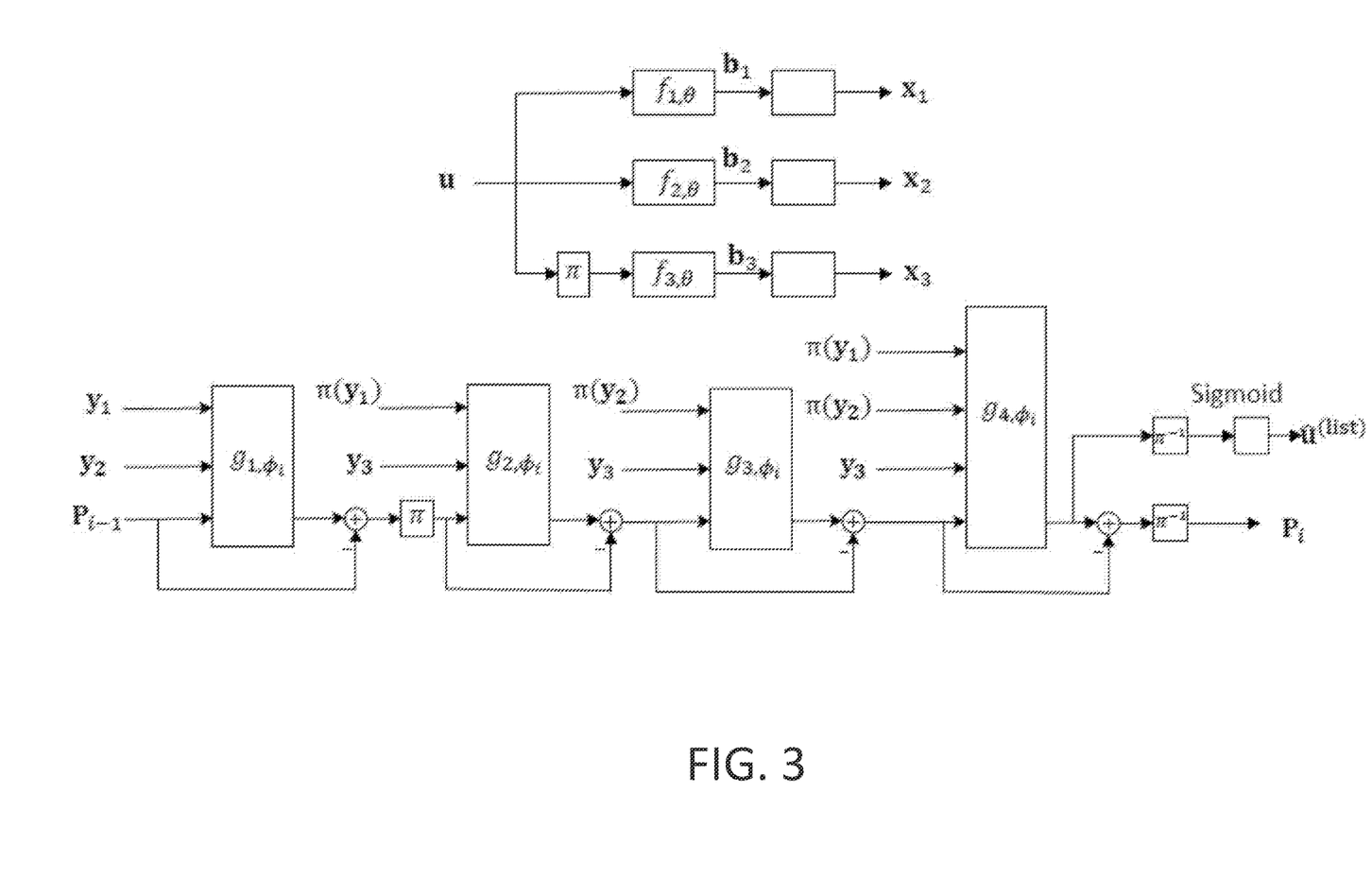
FIG. 3 an example decoder architecture, according to various embodiments of the present disclosure.

FIG. 3 is an example decoder architecture showing the rate-1/3 IR-listAE, according to an embodiment of the present disclosure. The encoder may be the same as the rate-1/3 TurboAE encoder. The output of the encoder is the length-N=3K codeword with normalized power $x=[x_1, \ldots, x_3]$. The decoder includes I serially concatenated iteration blocks. As can be seen in FIG. 3, each iteration block includes of four decoding blocks with rates (1/2, 1/2, 1/2, 1/3), taking the inputs $\{y_1, y_2\}$, $\{y_1, y_3\}$, $\{y_2, y_3\}$ and $\{y_1, y_2, y_3\}$, respectively, with applicable interleavers. An iteration i further takes a feature matrix $P_{i-1}$ of size K×L as an input, and outputs a feature matrix for iteration block i+1. The feature matrix $P_I$ output by iteration block I is passed through a sigmoid function and gives the output list of message word candidates. In some embodiments, the intermediate feature matrices may be like log-likelihood ratios (LLRs) of the message bits. Thus, as the output of the first iteration moves to the next iterations, the BER resulting from the feature matrices decreases. The interleavers may be employed to mimic their role on enhancing the distance properties of the code by introducing long term memory. At the decoder side, de-interleavers may be applied similar to TurboAE and turbo codes.

Power Normalization

In some embodiments, the output $b=[b_1, b_2, b_3]$ is given to a power normalization block giving the codeword $x=h(b)$ to meet power constraint requirements. There may be three types of power normalization: 1) codeword-wise normalization, codebit-wise normalization, and batch-wise normalization.

In a codeword-wise normalization, the normalized codeword x may be obtained from b as $$x = \frac{b - \mu}{\sigma}$$

where $\mu$ is the mean of the code bits, and $\sigma$ is the standard deviation of the code bits, wherein:

$$\mu = \frac{1}{N}\sum_{i=1}^{N} b_i, \text{ and}$$
$$\sigma = \sqrt{\frac{1}{N}\sum_{i=1}^{N}(b_i - \mu)^2}.$$

Accordingly, codeword-wise normalization places each codeword on an N-dimensional sphere with radius $\sqrt{N}$.

In a codebit-wise normalization, with a batch size of B, each code bit is normalized as $$x_i = \frac{b_i - \mu_i}{\sigma_i}$$

where $\mu_i$ is the mean of the code bit i over the B codewords in the batch, and $\sigma$ is the standard deviation of the code bit i over the B codewords in the batch. Accordingly, codebit-wise normalization places the set of B code bit i of the codewords in the batch on a B-dimensional sphere with radius $\sqrt{B}$ for i=1, ..., N.

In a batch-wise normalization, with a batch size of B, and codewords of length N, there are B.N code bits. Each codeword is normalized as $$x = \frac{b - \mu}{\sigma}$$

wnere $\mu$ is the mean of the B.N codebits and $\sigma$ is the standard deviation of the B.N code bits. Accordingly, batch-wise normalization places the set of B.N code bits in the batch on an B.N-dimensional sphere with radius $\sqrt{B.N}$.

Thus, with the codebit-wise normalization and the batch-wise normalization in the testing phase, $\mu_i$, $\sigma_i$, $\mu$ and $\sigma$ can be pre-computed from a large batch and be used directly on a single message word.

Train Methodology and Hyper Parameters

In some embodiments, other neural models can be used in place of the encoding and decoding blocks of the IR-listAE in FIG. 3. For example, fully connected neural network (FCNN), convolutional neural network (CNN), and recurrent neural network (RNN) may be utilized. In some embodiments, FCNN may be more difficult to train, and therefore may results in an inferior performance than CNN. RNN models such as Long-Short Term Memory (LSTM) and Gate Recurrent Unit (GRU) are also widely used in the sequential modeling problems and can bring global dependency. That is, unlike CNN, a code bit can be a function of a larger number of message bits, which in turn, may improve the Euclidean distance properties of the code for improved performance under MAP decoder. However, the code lengths of interest the decoder is not MAP, and therefore distance properties may not be relevant. Thus, CNN models may be easier to train and have superior performance over FCNN and RNN for the purpose of the IR-listAE. Moreover, local dependency issues of CNN can be mitigated by using sufficiently large kernel size or number of layers.

Table 1 shows training and hyper parameters of an example IR-listAE model, according to some embodiments of the present disclosure. The IR-listAE is iteratively trained for a maximum number of epochs. At each epoch, encoder is trained $T_{enc}$ times while freezing the weights of decoder, and then the decoder is trained $T_{dec}$ times while freezing the weights of encoder. Accordingly, such scheduled training may be used to avoid getting stuck in a local minimum. With a batch size of B for each training, a set of B randomly generated message words of length K=100 are generated and encoded by the encoder network. A set of B noise vectors of length-N may be generated and added to the codewords corresponding to the message words. The loss function may be evaluated between the B input message words and the B output lists, and the weights of encoder or decoder may be updated accordingly. Different noise vectors in the batch may be generated with the same or different SNRs. A fixed SNR may be used for training the encoder while a range of SNR may be used to train the decoder. For the decoder, for each noise vector, an SNR value may be randomly picked from the range and may be used to generate the vector. Sufficiently larges batch sizes with small learning rates may be used for fine tuning the network. To accommodate for larger batch sizes, 1 small batches of size B, are sued while accumulating the gradient of the loss function without updating the weights. This is equivalent to directly applying a larger batch size of $lB_s$.

TABLE 1

| Loss | BCE loss$_l$ in Eq. (2) |
|---|---|
| Encoder block $f_{k,\theta}(.)$ for k = 1, 2, 3 | 5 layers 1D-CNN plus one linear layer, kernel size 5, CNN output channels 100 |
| First three decoding block $g_{k,\phi i}$ for k = 1, 2, 3 | 5 layers 1D-CNN plus one (100, L) linear layer, the input and output channels of the CNN layers are (L + 2, 100) and (100, 100) for the first and next layers respectively, kernel size 5 |
| Fourth decoding block $g_{4,\phi i}$ | 5 layers 1D-CNN plus one (100, L) linear layer, the input and output channels of the CNN layers are (L + 3, 100) and (100, 100) for the first and next layers respectively, kernel size 5 |
| (learning rate, batch size B) | (.0001, 500) gradually changing to (.000001, 10000) |
| Encoder and decoder training SNR | 1 dB for encoder and [−1.5, 2] dB for decoder |

TABLE 1-continued

| Loss | BCE $loss_1$ in Eq. (2) |
|---|---|
| Activation function | Elu for CNN layers and Linear for the linear layers |
| Power normalization ($T_{enc}$, $T_{dec}$) | Batch-wise (100, 500) |
| Iterations | 6 |
| List size B | 64 |
| Number of epochs | 500 |

Simulation Results

Figure 4:
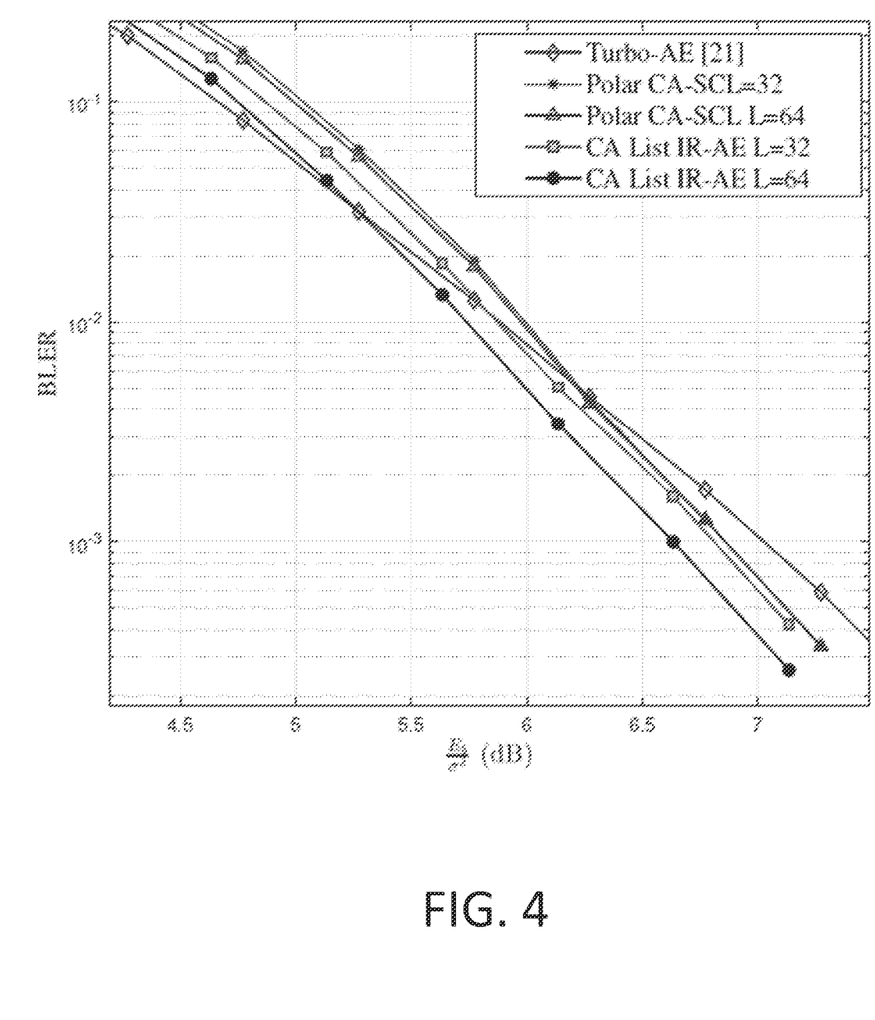
FIG. 4 is a graph showing simulation results from an example autoencoder, according to various embodiments of the present disclosure.

FIG. 4 is a graph showing simulation results from an example autoencoder.

The performance of the List IR-AE under CA decoding is evaluated and compared to classical codes and TurboAE. The code dimensions for the TurboAE and polar codes are (N=300, K=100). The polar codes are designed according to 3GPP NR reliability sequence and rate matching. For IR-AE a length-8 CRC generated by polynomial $g(x)=1+x^2+x^4+x^6+x^7+x^8$ is appended to the K=92 message bits before encoding. To have a fair comparison due to slight rate reduction by UKU, we look at $$\frac{E_b}{\sigma^2}$$

instead of SNR for a code of rate R where $$\frac{E_b}{\sigma^2} = SNR - 10\log_{10}R.$$

The result of the comparison is shown in FIG. 4 for large list sizes for the best performance. As can be seen, List IR-AE with a list size of L=64, outperforms TurboAE and the polar code at BLERs smaller than 0.03. At high SNRs, the coding gain can be as large as 0.5 dB and 0.3 dB over TurboAE and polar code, respectively.

Figure 5:
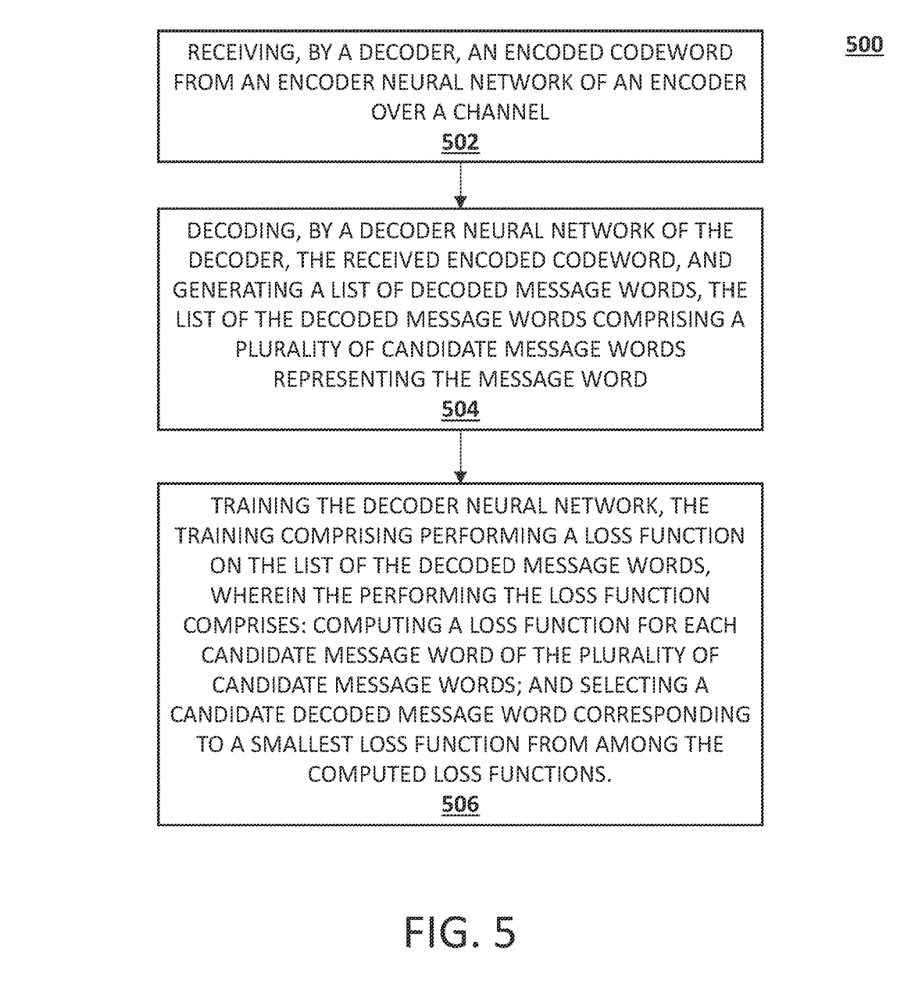
FIG. 5 is a flow chart of a method for improving autoencoders with list decoding for reliable data transmission over noisy channels, according to various embodiments of the present disclosure.

FIG. 5 is a flow chart 500 of a method for improving autoencoders with list decoding for reliable data transmission over noisy channels, according to various embodiments of the present disclosure. Accordingly, at step 502, a decoder may receive an encoded codeword from an encoder neural network of an encoder over at channel. In some embodiments, the channel may be a noisy channel, which may be modeled as an AWGN channel as previously described. Thus, the received encoded codeword may be prone to errors or distortion as a result of the noisy channel, and therefore a good decoding process desired to reproduce the original message word. At step 504, a decoder neural network of the decoder may decode the received encoded codeword, and generate a list of decoded message words. Accordingly, the list may comprise a plurality of candidate message words that represent the originally encoded message words. Because these message words are candidates, one or some of these candidate message words will be better representations of the original message word than others. Thus, it is desired to select the candidate message word that most closely represents the original message word. At step 506, the decoder neural network may be trained to improve the ability of the decoder to better decode the codewords. In some embodiments, the training process may include performing a loss function on the list of the decoded message words. The loss function may be calculated for each candidate message word of the plurality of candidate message words of the list, and then selecting the candidate decoded message word that corresponds to the smallest loss function from among the computed loss functions. In other words, the smallest loss function indicates approximately that the message word at the output of the decoder is the closest reproduction of the original message word that was encoded. On the other hand, a larger loss function indicates that the message word at the output of the decoder is relatively less similar to the original message word that was encoded. Consequently, it is desirable to select the candidate message word that is the closest to the original message word, thus reducing the likelihood of errors in the decoded message word.

Figure 6:
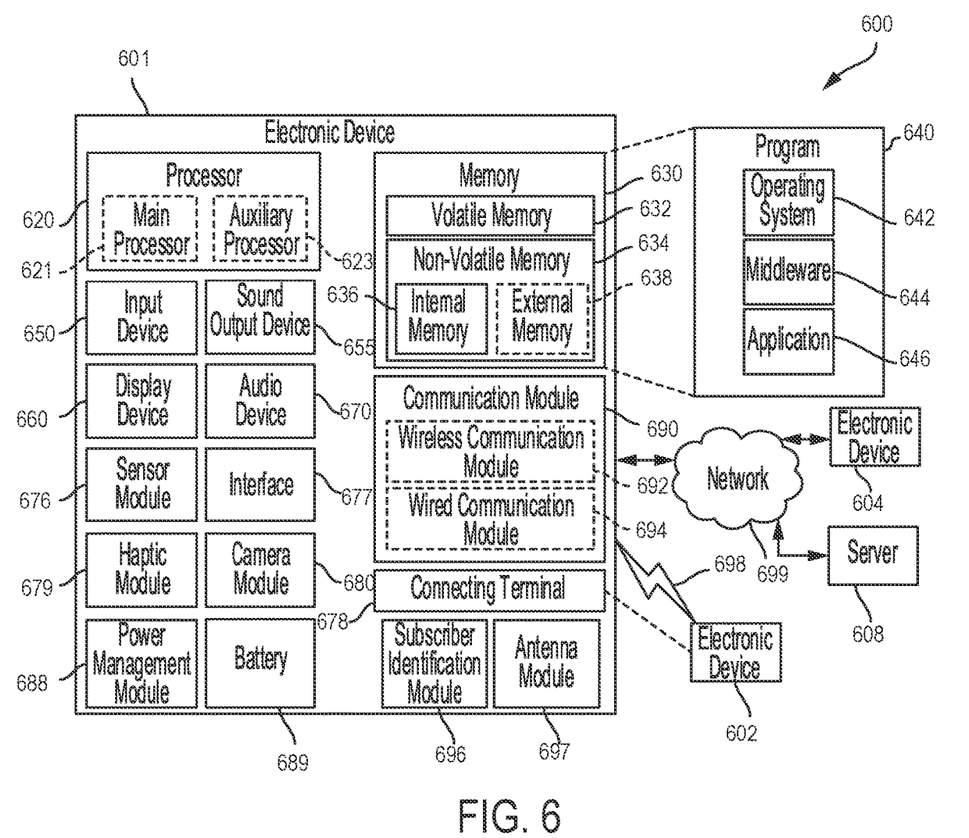
FIG. 6 is a block diagram of an electronic device in a network environment, according to various embodiments of the present disclosure.

FIG. 6 is a block diagram of an electronic device in a network environment 600, according to an embodiment.

Referring to FIG. 6, an electronic device 601 in a network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 640, a sound output device 655, a display device 660, an audio module 670, a sensor module 676, an interface 677, a haptic module 679, a camera module 680, a power management module 688, a battery 689, a communication module 690, a subscriber identification module (SIM) card 696, or an antenna module 694. In one embodiment, at least one (e.g., the display device 660 or the camera module 680) of the components may be omitted from the electronic device 601, or one or more other components may be added to the electronic device 601. Some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute software (e.g., a program 640) to control at least one other component (e.g., a hardware or a software component) of the electronic device 601 coupled with the processor 620 and may perform various data processing or computations.

As at least part of the data processing or computations, the processor 620 may load a command or data received from another component (e.g., the sensor module 646 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). The auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. The display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. The audio module 670 may obtain the sound via the input device 650 or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. The interface 677 may include, for example, a high-definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. The connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. The haptic module 679 may include, for example, a motor, a piezoelectric element, or an electrical stimulator.

The camera module 680 may capture a still image or moving images. The camera module 680 may include one or more lenses, image sensors, image signal processors, or flashes. The power management module 688 may manage power supplied to the electronic device 601. The power management module 688 may be implemented as at least part of, for example, a power management integrated circuit (PMIC).

The battery 689 may supply power to at least one component of the electronic device 601. The battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. The communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. The antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

Commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

Figure 7:
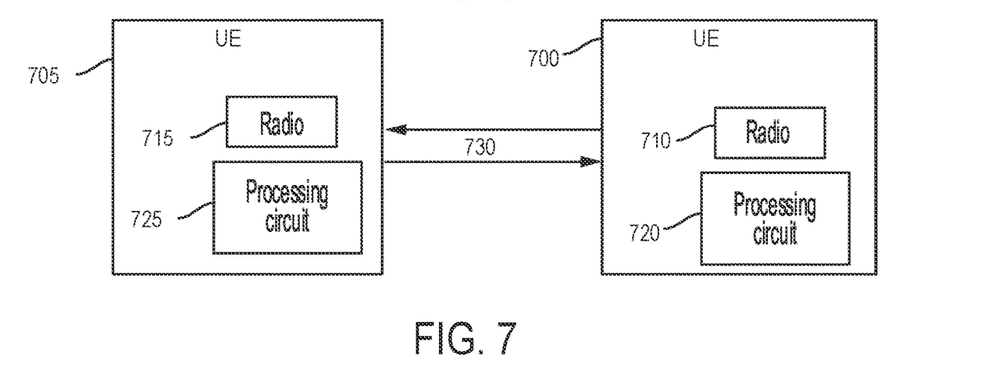
FIG. 7 is a system block diagram of a first electronic device in communication with a second electronic device, according to various embodiments of the present disclosure.

FIG. 7 shows a system including a first electronic device, such as, for example a first user equipment (UE) 705 and a second electronic device such as, for example, a second UE 700, in communication with each other. The first and second UEs 705, 700 may include a radio 715, 710 and a processing circuit (or a means for processing) 725, 720, which may perform various methods disclosed herein, e.g., the method illustrated in FIG. 5. The processing circuit 725, 720 may include an encoder and a decoder, and in some embodiments, may include an autoencoder that includes an encoder neural network and a decoder neural network that are trainable according to deep learning techniques described above. Accordingly, the first UE 705 may encode a message word by the encoder neural network and transmit the encoded codeword over a channel 730, which may be a noisy channel such as wireless network, and the second UE 700 may receive the transmitted encoded codeword. The second UE 700 may then decode the received codewords by a decoder neural network to generate the original message word according to the method described above, for example, with reference to FIG. 5.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A system comprising:
 a receiver circuit configured to receive an encoded codeword over a channel from an encoder neural network of an encoder; and
 a decoder circuit, including a decoder neural network, configured to decode the encoded codeword, and generate a list of decoded message words, the list of the decoded message words comprising a plurality of candidate message words representing the message word.

2. The system of claim 1, wherein the receiver circuit is further configured to perform training of the decoder neural network.

3. The system of claim 2, wherein the training comprises performing a loss function on the list of the decoded message words.

4. The system of claim 3, wherein the performing of the loss function comprises:
computing a loss function for each candidate message word of the plurality of candidate message words; and
selecting a candidate decoded message word corresponding to a smallest loss function from among the computed loss functions.

5. The system of claim 4, wherein the loss function comprises a mean squared error (MSE) loss function or a binary cross entropy (BCE) loss function.

6. The system of claim 5, wherein the loss function is the BCE loss function, and wherein the computing the BCE loss function comprises determining an average BCE of a first vector and a second vector of length K.

7. The system of claim 1, wherein the decoder comprises:
a first sub-decoder configured to receive a first vector of the encoded codeword from the encoder and a second vector of the encoded codeword from the encoder;
a second sub-decoder configured to receive the first vector of the encoded codeword from the encoder, a third vector of the encoded codeword from the encoder, and a first output from the first sub-decoder;
a third sub-decoder configured to receive the second vector of the encoded codeword from the encoder, the third vector of the encoded codeword from the encoder, and a second output from the second sub-decoder; and
a fourth sub-decoder configured to receive the first vector of the encoded codeword from the encoder, the second vector of the encoded codeword from the encoder, the third vector of the encoded codeword from the encoder, and a third output from the third sub-decoder.

8. The system of claim 7, wherein the receiver circuit is further configured to perform a sigmoid function at a fourth output from the fourth sub-decoder to generate the list of the decoded message words.

9. A method comprising:
receiving, by a decoder, an encoded codeword from an encoder neural network of an encoder over a channel; and
decoding, by a decoder neural network of the decoder, the received encoded codeword, and generating a list of decoded message words, the list of the decoded message words comprising a plurality of candidate message words representing the message word.

10. The method of claim 9, further comprising training the decoder neural network, the training comprising performing a loss function on the list of the decoded message words.

11. The method of claim 10, wherein the performing the loss function comprises:
computing a loss function for each candidate message word of the plurality of candidate message words; and
selecting a candidate decoded message word corresponding to a smallest loss function from among the computed loss functions.

12. The method of claim 11, wherein the loss function comprises a mean squared error (MSE) loss function or a binary cross entropy (BCE) loss function.

13. The method of claim 12, wherein the loss function is the BCE loss function, and wherein the computing the BCE loss function comprises determining an average BCE of a first vector and a second vector of length K.

14. The method of claim 9, wherein the decoding comprises:
receiving, by a first sub-decoder, a first vector of the encoded codeword from the encoder and a second vector of the encoded codeword from the encoder;
receiving, by a second sub-decoder, the first vector of the encoded codeword from the encoder, a third vector of the encoded codeword from the encoder, and a first output from the first sub-decoder;
receiving, by a third sub-decoder, the second vector of the encoded codeword from the encoder, the third vector of the encoded codeword from the encoder, and a second output from the second sub-decoder; and
receiving, by a fourth sub-decoder, the first vector of the encoded codeword from the encoder, the second vector of the encoded codeword from the encoder, the third vector of the encoded codeword from the encoder, and a third output from the third sub-decoder.

15. The method of claim 14, wherein the decoding further comprises performing a sigmoid function at a fourth output from the fourth sub-decoder to generate the list of the decoded message words.

16. A decoder comprising a processor configured to:
receive an encoded codeword from an encoder neural network of an encoder over a channel; and
decode, by a decoder neural network of the decoder, the received encoded codeword, and generate a list of decoded message words, the list of the decoded message words comprising a plurality of candidate message words representing the message word.

17. The decoder of claim 16, wherein the processor is further configured to train the decoder neural network, the training comprising performing a loss function on the list of the decoded message words.

18. The decoder of claim 17, wherein the performing the loss function comprises:
computing a loss function for each candidate message word of the plurality of candidate message words; and
selecting a candidate decoded message word corresponding to a smallest loss function from among the computed loss functions.

19. The decoder of claim 16, further comprising:
a first sub-decoder configured to receive a first vector of the encoded codeword from the encoder and a second vector of the encoded codeword from the encoder;
a second sub-decoder configured to receive the first vector of the encoded codeword from the encoder, a third vector of the encoded codeword from the encoder, and a first output from the first sub-decoder;
a third sub-decoder configured to receive the second vector of the encoded codeword from the encoder, the third vector of the encoded codeword from the encoder, and a second output from the second sub-decoder; and
a fourth sub-decoder configured to receive the first vector of the encoded codeword from the encoder, the second vector of the encoded codeword from the encoder, the third vector of the encoded codeword from the encoder, and a third output from the third sub-decoder.

20. The decoder of claim 19, wherein the processor is further configured to perform a sigmoid function at a fourth output from the fourth sub-decoder to generate the list of the decoded message words.

* * * * *